United States Patent
Muthiah

(10) Patent No.: US 11,140,445 B1
(45) Date of Patent: Oct. 5, 2021

(54) STORAGE SYSTEM AND METHOD FOR STORING SCALABLE VIDEO

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 16/891,802

(22) Filed: Jun. 3, 2020

(51) Int. Cl.
*H04N 21/443* (2011.01)
*H04N 21/2662* (2011.01)
*H04N 21/45* (2011.01)
*H04N 21/418* (2011.01)
*H04N 21/472* (2011.01)

(52) U.S. Cl.
CPC ..... *H04N 21/4435* (2013.01); *H04N 21/2662* (2013.01); *H04N 21/4184* (2013.01); *H04N 21/4532* (2013.01); *H04N 21/47217* (2013.01)

(58) Field of Classification Search
CPC .......... H04N 21/4435; H04N 21/4184; H04N 21/47217; H04N 21/4532; H04N 21/2662
See application file for complete search history.

(56) References Cited

U.S. PATENT DOCUMENTS

| | | | |
|---|---|---|---|
| 6,768,661 B2 | 7/2004 | Vyvoda et al. | |
| 7,643,560 B2 | 1/2010 | Hong et al. | |
| 8,432,968 B2 | 4/2013 | Ye et al. | |
| 8,725,940 B2 | 5/2014 | Grube et al. | |
| 10,007,442 B2 | 6/2018 | Hahn et al. | |
| 10,228,854 B2 | 3/2019 | Romanovsky et al. | |
| 2006/0023748 A1* | 2/2006 | Chandhok | H04J 3/16 |
| 2007/0121723 A1 | 5/2007 | Mathew et al. | |
| 2009/0268806 A1* | 10/2009 | Kim et al. | H04N 7/24 |
| 2010/0169541 A1* | 7/2010 | Freikron | G06F 12/02 |
| 2010/0238994 A1 | 9/2010 | Cakareski et al. | |
| 2011/0235700 A1 | 9/2011 | Thang et al. | |
| 2014/0115230 A1* | 4/2014 | Yang et al. | |
| 2018/0302636 A1 | 10/2018 | Yu et al. | |
| 2020/0004671 A1 | 1/2020 | Neufeld et al. | |

OTHER PUBLICATIONS

U.S. Appl. No. 16/708,091 entitled "Storage System and Method for Video Frame Segregation to Optimize Storage" filed Dec. 9, 2019.
"Scalable Video Coding"; Wikipedia entry; downloaded from the Internet at https://en.wikipedia.org/wiki/Scalable_Video_Coding on Dec. 11, 2019; 3 pages.

(Continued)

*Primary Examiner* — Anthony Bantamoi
(74) *Attorney, Agent, or Firm* — Crowell & Moring LLP

(57) ABSTRACT

A storage system and method for storing scalable video are provided. In one embodiment, a storage system is presented comprising a memory and a controller. The controller is configured to receive, from a host, video data and a plurality of profiles for the video data; receive, from the host, usage information on each of the plurality of profiles; and store the plurality of profiles in the memory, wherein a profile that is used more frequently is stored in a higher endurance and/or high protection portion of the memory than a profile that is used less frequently. Other embodiments are provided.

20 Claims, 7 Drawing Sheets

(56) References Cited

OTHER PUBLICATIONS

"Advanced Video Coding"; Wikipedia entry; downloaded from the Internet at https://en.wikipedia.org/wiki/Advanced_Video_Coding on Dec. 11, 2019; 16 pages.
NVM Express, Revision 1.3; Interface specification; May 1, 2017; 282 pages.
International Search Report completed May 11, 2021 for International Application No. PCT/US2021/016876.
Written Opinion completed May 11, 2021 for International Application No. PCT/US2021/016876.
Israel Patent Office Search Strategy completed May 11, 2021 for International Application No. PCT/US2021/016876.

* cited by examiner

STORAGE SYSTEM AND METHOD FOR STORING SCALABLE VIDEO

BACKGROUND

A host can send read and write requests to a storage system to read video data from and store video data in a memory of the storage system. A playback system (in the host or in another device connected to the host) can be used to playback the video data. The video data can be a Scalable Video Coding (SVC) bitstream, which contains a plurality of subset bitstreams that can represent a lower spatial resolution, a lower temporal resolution, or a lower quality video signal compared to a baseline bitstream. A plurality of profiles can be sent on top of the baseline stream and used by the playback system to add precision and quality to the scalable video data for various applications.

DETAILED DESCRIPTION

Overview

Figure 1A:
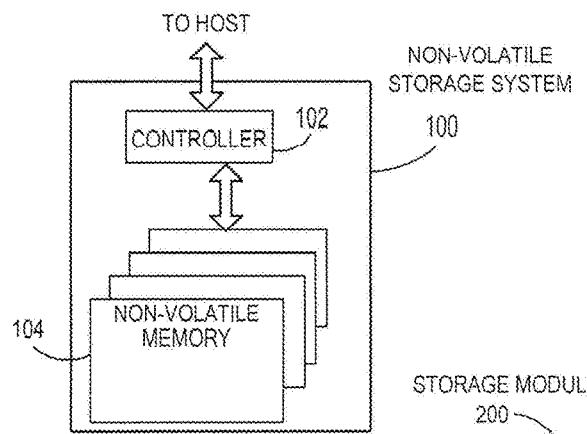
FIG. 1A is a block diagram of a non-volatile storage system of an embodiment.

By way of introduction, the below embodiments relate to a storage system and method for storing scalable video. In one embodiment, a storage system is presented comprising a memory and a controller. The controller is configured to receive, from a host, video data and a plurality of profiles for the video data; receive, from the host, usage information on each of the plurality of profiles; and store the plurality of profiles in the memory, wherein a profile that is used more frequently is stored in a higher endurance and/or high protection portion of the memory than a profile that is used less frequently.

In some embodiments, the video data comprises a scalable video coding (SVC) bitstream.

In some embodiments, the usage information is generated from a data decode pattern of a video playback system.

In some embodiments, the video playback system is part of the host.

In some embodiments, the video playback system is separate from the host.

In some embodiments, the controller is further configured to store the video data in the higher endurance and/or high protection portion of the memory.

In some embodiments, the controller is further configured to determine additional usage information of each of the plurality of profiles through memory retrieval patterns of data associated with each of the plurality of profiles.

In some embodiments, the memory comprises a three-dimensional memory.

In another embodiment, a method is presented that is performed in a host in communication with a storage system comprising a memory. The method comprises sending video data and a plurality of extension packets for the video data to the storage system; and instructing the storage system on which regions of the memory to store each of the plurality of extension packets based on a playback application's usage of the extension packets.

In some embodiments, the host instructs that extension packets that are used more frequently by the playback application are to be stored in a higher endurance and/or high protection portion of the memory than extension packets that are used less frequently.

In some embodiments, the video data comprises a scalable video coding (SVC) bitstream.

In some embodiments, the playback application is part of the host.

In some embodiments, the playback application is separate from the host.

In some embodiments, the method further comprises determining which of the plurality of extension packets are not supported by the playback application.

In some embodiments, the method further comprises determining additional usage information of each of the plurality of extension packets based on memory retrieval patterns of data associated with each of the plurality of extension packets.

In another embodiment, a storage system is presented comprising a memory; and means for storing a plurality of profiles for video data in different parts of the memory based on usage information of the plurality of profiles.

In some embodiments, a profile that is used more frequently is stored in a higher endurance and/or high protection portion of the memory than a profile that is used less frequently.

In some embodiments, the usage information is received from a host.

In some embodiments, the storage system further comprises means for determining the usage information.

In some embodiments, the video data comprises a scalable video coding (SVC) bitstream.

Other embodiments are possible, and each of the embodiments can be used alone or together in combination. Accordingly, various embodiments will now be described with reference to the attached drawings.

EMBODIMENTS

Figure 1B:
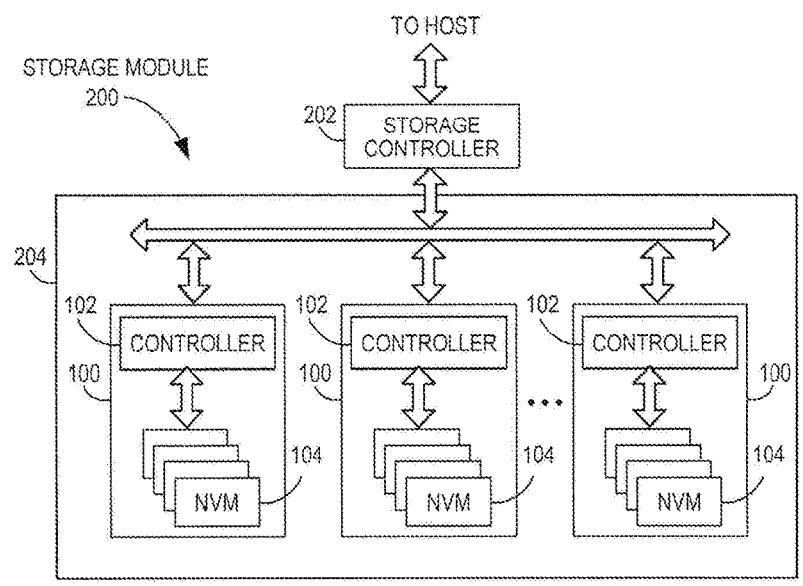
FIG. 1B is a block diagram illustrating a storage module of an embodiment.
Figure 1C:
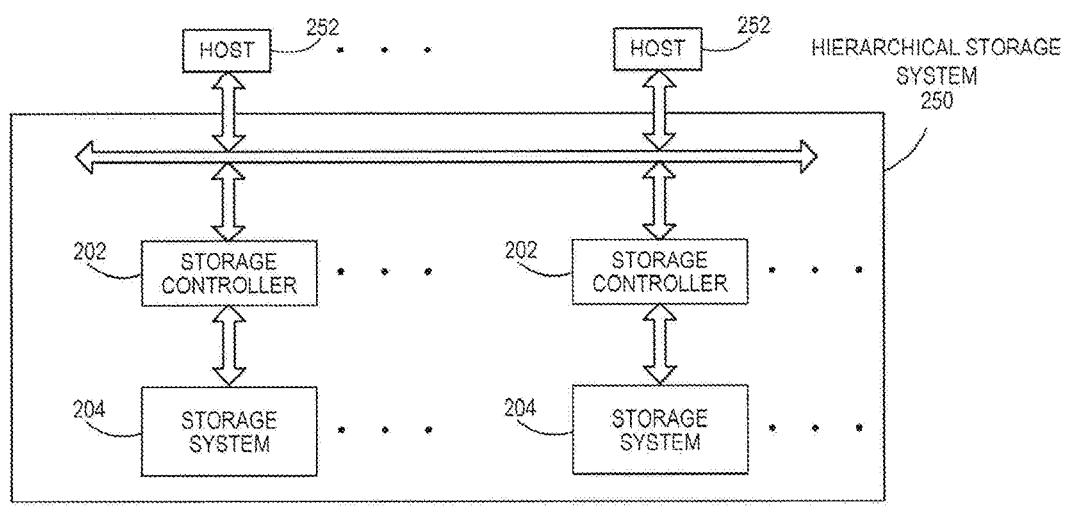
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
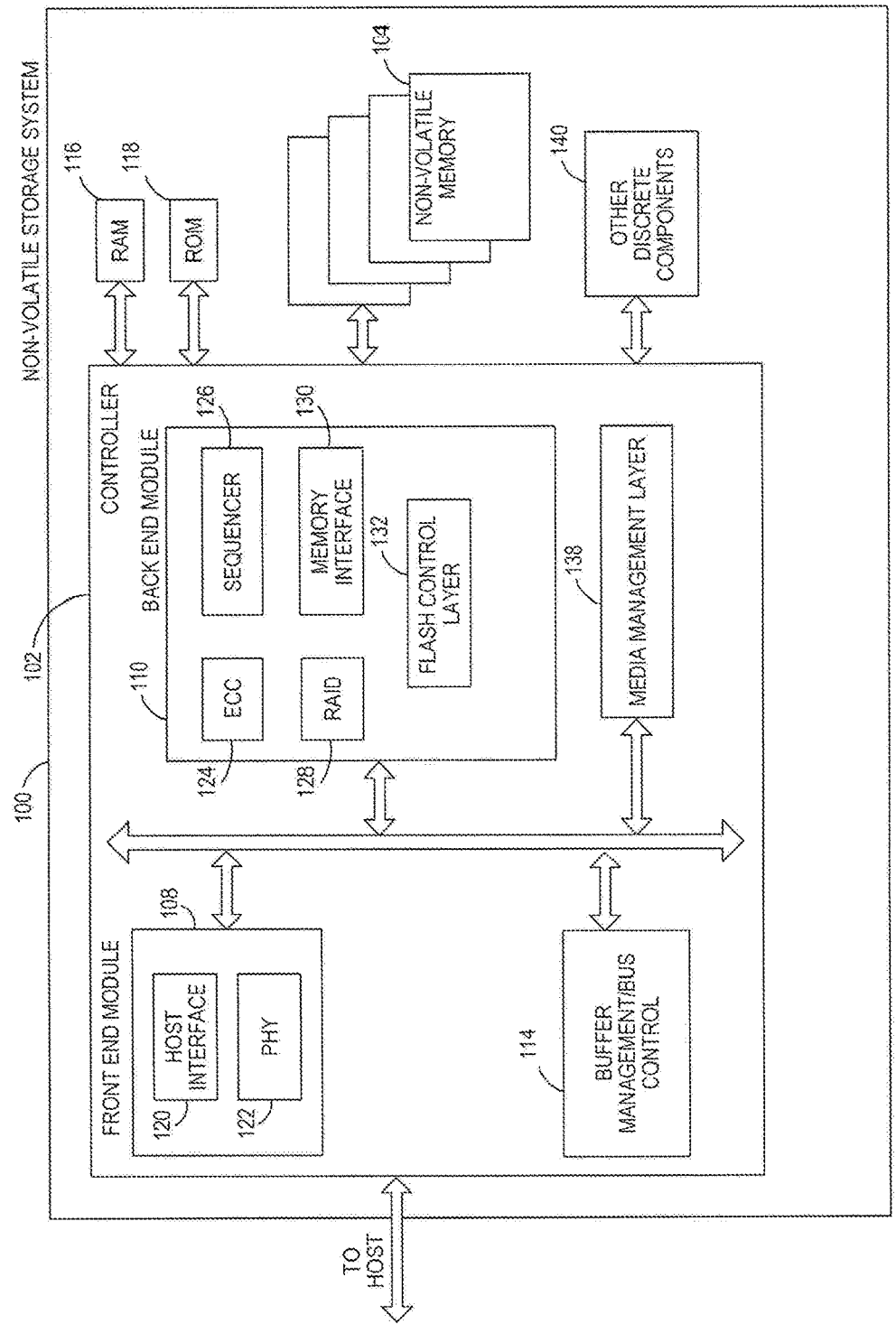
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
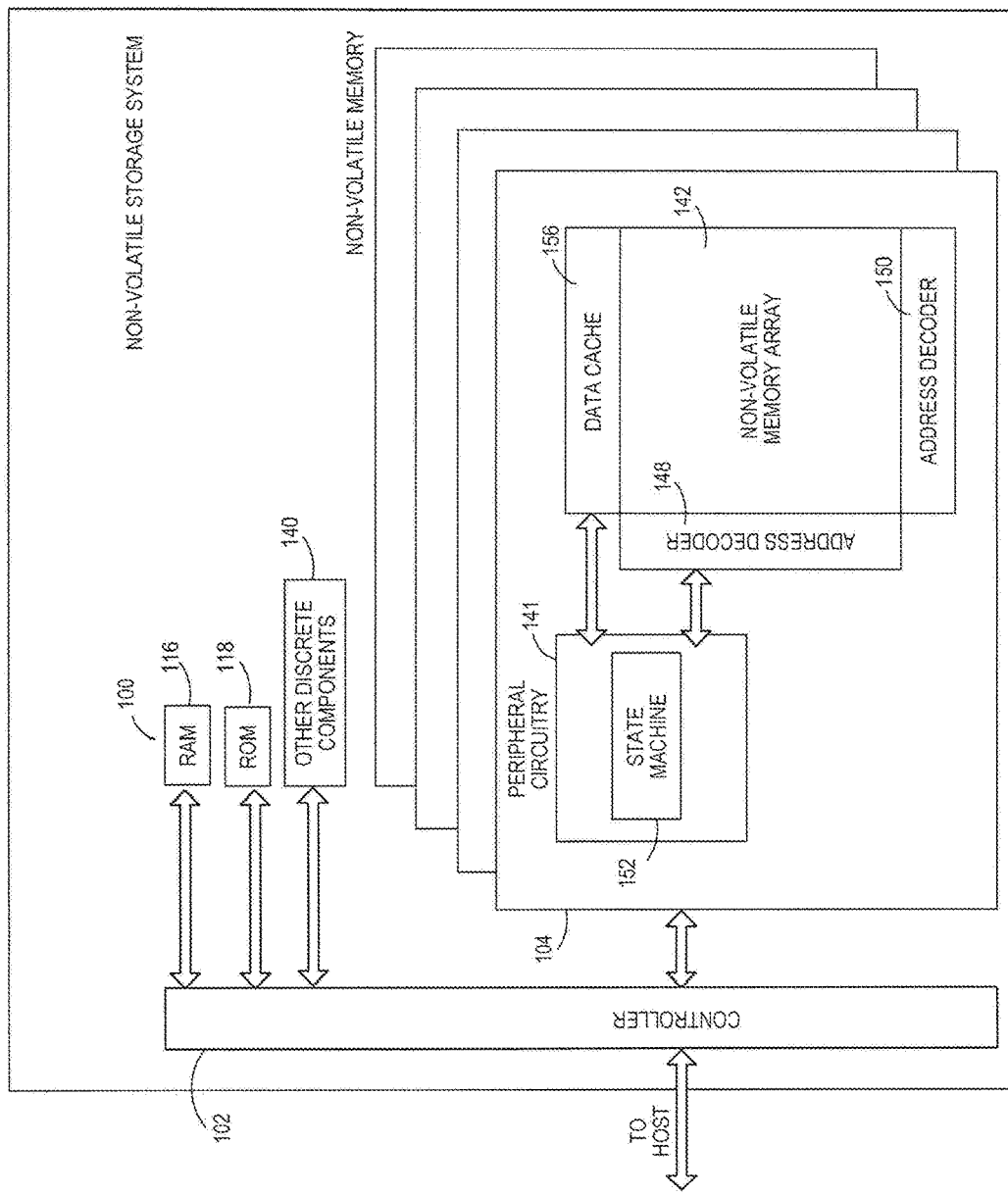
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
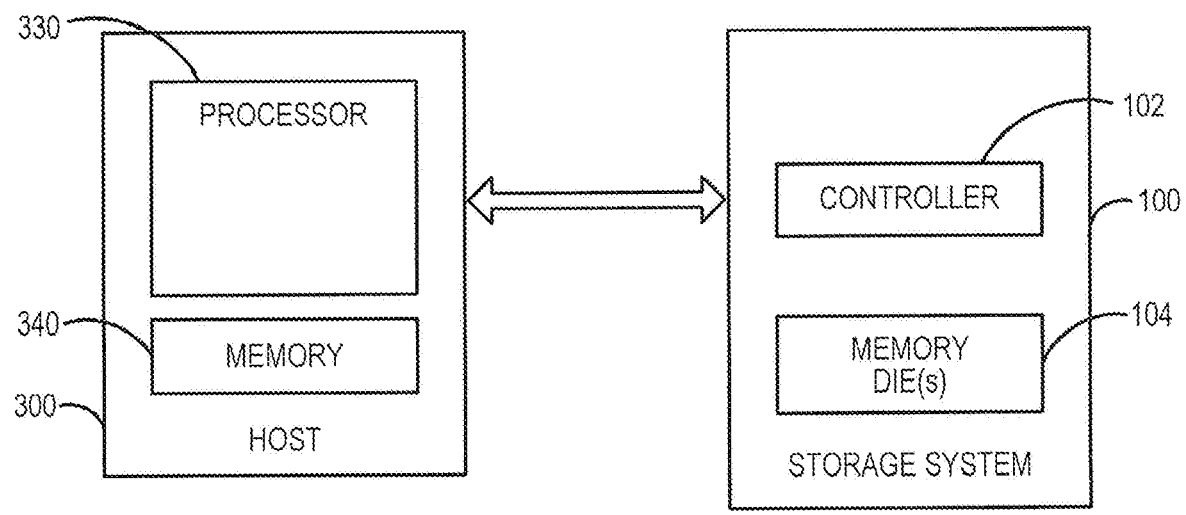
FIG. 3 is a block diagram of a computing device and storage system of an embodiment.

Turning again to the drawings, FIG. 3 is a block diagram of a host 300 and storage system 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to playback media read from the memory 104 of the storage system 100. For example, the processor 330 in the host 300 can execute a playback application/system to play video sent from the storage system 100. Alternatively, the playback application can be executed by a separate device that is in communication with the host 300.

Any suitable coding system can be used for the data used by the playback system. For example, Scalable Video Coding (SVC) is a video compression standard that encodes a high-quality video bitstream that contains a plurality of subset bitstreams. The subset bitstreams can represent a lower spatial resolution (smaller picture size), a lower temporal resolution (lower frame rate), or a lower quality (lower signal-to-noise ratio (SNR)) video signal compared to the bitstream it is derived from. The SVC video bitstream is sent from a storage system to a host, and a playback system (integrated with or connected to the host) derives a desired subset bitstream by dropping packets from the larger bitstream.

A plurality of profiles (sometimes referred to herein as "extension packets") can also be sent with the SVC video bitstream. Profiles are optional delta packets on top of the baseline stream that add precision and quality to the scalable video data at the cost of decode bandwidth. The playback system can select one of these profiles and apply it to the selected subset bitstream to enhance the playback of the video. These profiles can include a scalable baseline profile, a scalable high profile, and a scalable high intro profile. The scalable baseline profile may be desired for conversational, mobile, and surveillance applications. The scalable high profile may be desired for broadcast, streaming, storage, and videoconferencing applications. The scalable high intro profile may be desired for professional applications. Constrained versions of these profiles can also be used.

Figure 4:
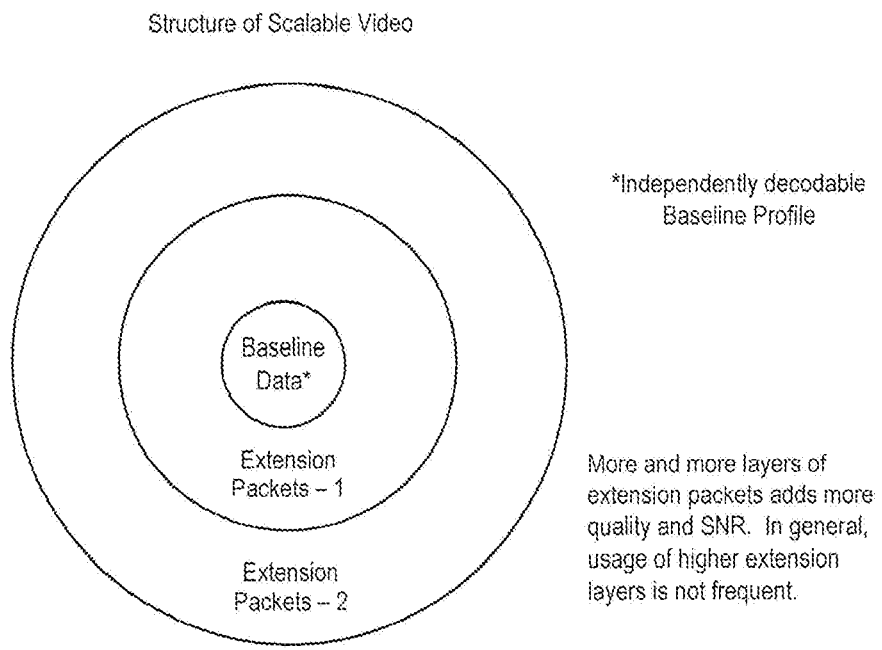
FIG. 4 is a diagram that illustrates a structure of scalable video of an embodiment.

The usage of baseline data and extension packets is illustrated in FIG. 4. As shown in FIG. 4, the baseline data (using an independently-decodable baseline profile) is the most-used data item; hence, it is at the center of the circle. Extension Packets (Profiles) 1 and 2 are shown as rings around the center circle. More and more layers of extension packets add more quality and a higher signal-to-noise (SNR) ratio. Extension Packet (Profile) 1 is not used often compared to the baseline profile, and Extension Packet (Profile) 2 is used even less often. Accordingly, Extension Packet (Profile) 1 is positioned in a first ring around the circle, and Extension Packet (Profile) 2 is positioned in a second ring around the circle.

As mentioned above, typically, the scalable video data and all of its profiles are stored in the storage system as one entity and read and provided to the host as one entity. However, a typical playback system only uses some of the profiles of the scalable video data and strips and disposes of the unused profiles. That is, even if a video stream has high-profile content, the playback system decodes only according to its capability. So, for example, conversational, mobile, and surveillance applications only need the scalable baseline profile, whereas broadcast, streaming, storage and videoconferencing applications need the scalable high profile of the stream.

The following embodiments leverage the fact that only some of the profiles are used along with the fact that the storage system 100 can allow the host 300 to classify and store data for different endurance and/or protection groups/areas of the memory (e.g., such as when the storage system 100 follows the NVMe storage specification). Storing video profiles according to endurance and/or protection requirements can extend the life of the storage system 100 and improve quality of service (QoS) in terms of optimal garbage collection. It should be noted that while the below examples will be discussed in terms of scalable video coding, these embodiments can be used with other protocols that use a plurality of profiles or extension packets with video data. Also, while these examples will be discussed in terms of video data, these embodiments can also be applied to static image and/or audio data. For instance, image data typically has a plurality of metadata associated with it, and it may not be necessary to decode all the metadata. So, the header part of an image, which is typically vital to decoding the image, can be stored in a high endurance and/or high protection blocks of the memory 104, whereas lesser-used portions of the metadata can be stored in lower-endurance and/or lower-protection blocks. However, since audio and image data form a relatively-small part of data rates in a media stream, the overhead associated with these embodiments may (or may not) outweigh the benefits for those forms of data.

In general, with these embodiments, the plurality of profiles for video data are stored in different parts of the memory based on usage information of the plurality of profiles. The usage information can be determined by the host 300 or the storage system 100, and the different parts of the memory can be different endurance and/or protection (based on error correction code capabilities) portions of the memory. In this way, a profile that is used more frequently can be stored in a higher endurance and/or high protection portion of the memory than a profile that is used less frequently.

Figure 5:
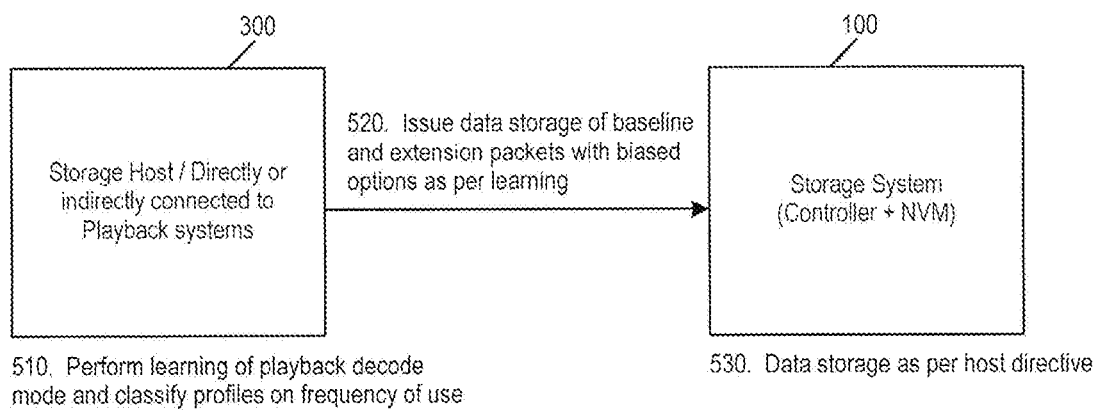
FIG. 5 is a block diagram of an embodiment in which a host determines usage information of profiles.

Returning to the drawings, FIG. 5 is a block diagram of an embodiment in which the host 300 determines usage information of the plurality of profiles. In this example, the playback system (multiple playback systems can be used) can be part of the host 300 or separate from the host 300 but directly or indirectly connected to it. In general, the host 300 instructs the storage system 100 on which regions of the memory 104 to store each of the plurality of extension packets based on a playback application's usage of the extension packets. As shown in FIG. 5, the host 300 performs learning of the playback decode mode and classifies profiles on frequency of use (act 510). For example, the host 300 can perform learning on the data decode pattern of the playback system to determine which profiles were used. Next, the host 300 issues data storage commands of the baseline stream and the extension packets with biased options as per the learning mentioned above (act 520). For example, based on the decode pattern, the host 300 can modify its storage pattern such that it instructs the storage system 100 to store the baseline and highly-utilized scalable extension profiles/packets to the high endurance and/or high protection group in the memory 104 (e.g., using the NVMe protocol) and to store rarely-utilized scalable extension packets in the low endurance and/or low protection group in the memory 104. In response to receiving these commands, the storage system 100 stores the extension packets per the host's directives (act 530).

It should be noted that while the host 300 can perform learning on profile segregation to route the content appropriately in the memory 104, the storage system 100 can, as a default, segregate the baseline profile from rest of the extension packets and store it in different storage endurance and/or protection groups. In other cases, the playback system can send the played profile to the host 300 to enable the host 300 in its decision on endurance and/or protection segregation. Also, the host 300 can determine that the hardware of the playback system is limited and can only play a certain profile. In that situation, during storage, the host 300 can downgrade the storage endurance and/or protection for all the extension packets above the playable profile. For example, if the three-dimensional video coding and multi-view video coding packet extensions are not playable by the playback system, the host 300 can store these extensions in the lower endurance and/or protection areas of the memory 104.

Also, in some situations, data retrieval from host 300 or the storage system 100 device is for a certain profile. Based on such requests, the host 300 or the storage system 100 can perform learning and apply that learning to route the baseline and the partial bit streams into different endurance and/or protection groups of the memory 104.

As noted above, usage information of the plurality of profiles can be determined by the storage system 100 instead of the host 300. For example, the storage system 100 can learn the data decode pattern through host configuration and self-determine the data endurance and/or protection requirements for routing. In operation, the host 300 can send the data decode pattern used by the playback application to the storage system 100, and the storage system 100 can perform learning to segregate the video profiles into different endurance and/or protection groups. In this embodiment, the host 300 can provide the details of the playback mode to the storage system 100, so the storage system 100 can store the baseline video data in healthier memory blocks compared to the extension packets.

Figure 6:
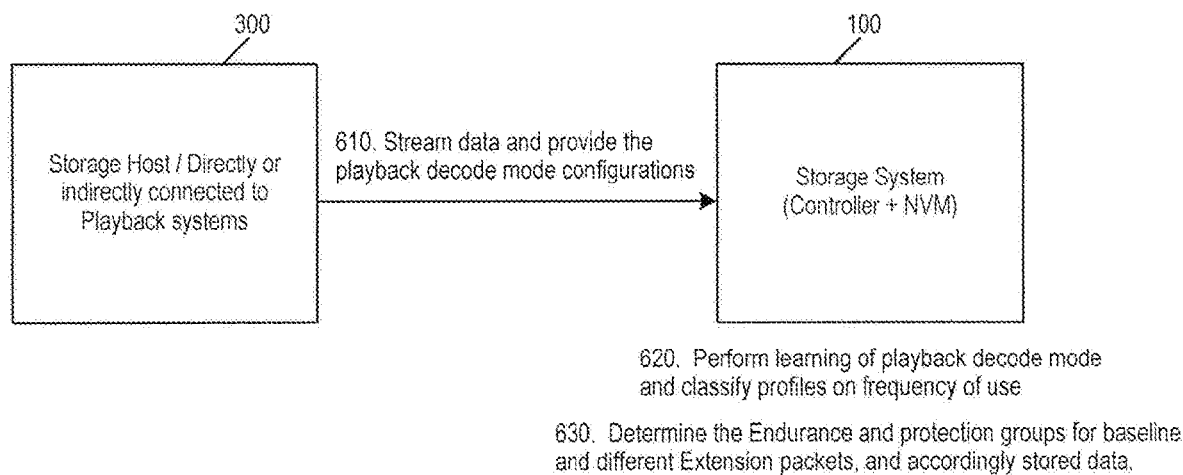
FIG. 6 is a block diagram of an embodiment in which a storage system determines usage information of profiles.

This alternative is illustrated in FIG. 6. As shown in FIG. 6, the host 300 streams the data to the storage system 100 and provides the storage system 100 with the playback decode mode configurations (act 610). In response, the storage system 100 performs learning of the playback decode mode and classifies the profiles on frequency of use (act 620). Then, the storage system 100 determines the endurance and/or protection groups in the memory 104 for storing the baseline video data and the different extension packets and stores them accordingly (act 630).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
a memory; and
a controller configured to:
receive, from a host, compressed video data and a plurality of profiles for enhancing a quality of playback of the compressed video data;
receive, from the host, usage information on each of the plurality of profiles, wherein the usage information is gathered prior to the plurality of profiles being stored in the memory; and
store the plurality of profiles in the memory, wherein a profile that is used more frequently is stored in a higher endurance and/or high protection portion of the memory than a profile that is used less frequently.

2. The storage system of claim 1, wherein the compressed video data comprises a scalable video coding (SVC) bitstream.

3. The storage system of claim 1, wherein the usage information is generated from a data decode pattern of a video playback system.

4. The storage system of claim 3, wherein the video playback system is part of the host.

5. The storage system of claim 3, wherein the video playback system is separate from the host.

6. The storage system of claim 1, wherein the controller is further configured to store the compressed video data in the higher endurance and/or high protection portion of the memory.

7. The storage system of claim 1, wherein the controller is further configured to determine additional usage information of each of the plurality of profiles through memory retrieval patterns of data associated with each of the plurality of profiles.

8. The storage system of claim 1, wherein the memory comprises a three-dimensional memory.

9. The storage system of claim 1, wherein the compressed video data comprises scalable video data.

10. The storage system of claim 9, wherein the scalable video data comprises a baseline bitstream and a plurality of subset bitstreams that represent a lower spatial resolution, a lower temporal resolution, and/or a lower quality video signal compared to the baseline bitstream.

11. A method comprising:
performing the following in a host in communication with a storage system comprising a memory:
sending, to the storage system, compressed video data and a plurality of extension packets for enhancing the quality of playback of the compressed video data; and
instructing the storage system on which regions of the memory to store each of the plurality of extension packets based on a playback application's usage of each of the plurality of extension packets, wherein the playback application's usage of each of the plurality of extension packets is determined prior to the plurality of extension packets being sent to the storage system.

12. The method of claim 11, wherein the host instructs that extension packets that are used more frequently by the playback application are to be stored in a higher endurance and/or high protection portion of the memory than extension packets that are used less frequently.

13. The method of claim 11, wherein the compressed video data comprises a scalable video coding (SVC) bitstream.

14. The method of claim 11, wherein the playback application is part of the host.

15. The method of claim 11, wherein the playback application is separate from the host.

16. The method of claim 11, further comprising determining which of the plurality of extension packets are not supported by the playback application.

17. The method of claim 11, further comprising determining additional usage information of each of the plurality of extension packets based on memory retrieval patterns of data associated with each of the plurality of extension packets.

18. The method of claim 11, wherein the compressed video data comprises scalable video data.

19. The method of claim 18, wherein the scalable video data comprises a baseline bitstream and a plurality of subset bitstreams that represent a lower spatial resolution, a lower temporal resolution, and/or a lower quality video signal compared to the baseline bitstream.

20. A storage system comprising:
a memory; and
means for storing a plurality of profiles for enhancing a quality of playback of compressed video data in different parts of the memory based on usage information of the plurality of profiles, wherein the usage information is received from a host prior to the plurality of profiles being stored in the memory.

* * * * *